(12) United States Patent
Rhee et al.

(10) Patent No.: US 12,468,936 B2
(45) Date of Patent: Nov. 11, 2025

(54) METHOD AND DEVICE WITH RESERVOIR MANAGEMENT FOR NEURAL NETWORK ONLINE LEARNING

(71) Applicants: SAMSUNG ELECTRONICS CO., LTD., Suwon-si (KR); SNU R&DB FOUNDATION, Seoul (KR)

(72) Inventors: Seonmin Rhee, Seoul (KR); Chris Dongjoo Kim, Seoul (KR); Gunhee Kim, Seoul (KR); Jinseo Jeong, Seoul (KR); Seungju Han, Seoul (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 1079 days.

(21) Appl. No.: 17/348,678

(22) Filed: Jun. 15, 2021

(65) Prior Publication Data

US 2022/0012588 A1 Jan. 13, 2022

(30) Foreign Application Priority Data

Jul. 9, 2020 (KR) .................... 10-2020-0084775
Dec. 1, 2020 (KR) .................... 10-2020-0166007

(51) Int. Cl.
*G06N 3/08* (2023.01)
*G06N 3/04* (2023.01)
(52) U.S. Cl.
CPC ............... *G06N 3/08* (2013.01); *G06N 3/04* (2013.01)
(58) Field of Classification Search
CPC .................................. G06N 3/08; G06N 3/04
See application file for complete search history.

(56) References Cited

U.S. PATENT DOCUMENTS 10,152,673 B2 * 12/2018 Yilmaz ............... G06N 3/063
10,635,947 B2 *  4/2020 Chen ................. G06N 5/01
(Continued)

FOREIGN PATENT DOCUMENTS

JP      2019-527440 A     9/2019
KR  10-2018-0132487 A    12/2018
(Continued)

OTHER PUBLICATIONS

Hayes, Tyler L., Nathan D. Cahill, and Christopher Kanan. "Memory efficient experience replay for streaming learning." 2019 International Conference on Robotics and Automation (ICRA). IEEE, 2019. (Year: 2019).*

(Continued)

*Primary Examiner* — Vincent Gonzales
*Assistant Examiner* — Isis Marie Black
(74) *Attorney, Agent, or Firm* — NSIP Law

(57) ABSTRACT

A reservoir management method includes: in response to receiving input data to which label information is mapped, determining whether to add the input data to a reservoir based on a sampling probability; in response to determining to add the input data to the reservoir when the reservoir is filled, selecting candidate data to be removed from among sets of sample data included in the reservoir based on a target label distribution and a current label distribution of the reservoir, and removing the selected candidate data from the reservoir; and training a neural network model using sample data of the reservoir from which the selected candidate data is removed.

21 Claims, 12 Drawing Sheets

(56) References Cited

U.S. PATENT DOCUMENTS

| | | | | |
|---|---|---|---|---|
| 11,010,691 | B1* | 5/2021 | Chen | G06N 20/00 |
| 11,068,773 | B2* | 7/2021 | Florez Choque | G06N 3/045 |
| 11,610,079 | B2* | 3/2023 | Yang | G06F 18/217 |
| 11,676,034 | B2* | 6/2023 | Almazán | G06V 10/82 706/20 |
| 11,922,303 | B2* | 3/2024 | Liu | G06N 3/084 |
| 11,995,566 | B2* | 5/2024 | Goyal | G06N 5/022 |
| 2018/0330238 | A1* | 11/2018 | Luciw | G06F 18/2413 |
| 2019/0102692 | A1* | 4/2019 | Kwant | G06F 18/2411 |
| 2019/0130247 | A1 | 5/2019 | Ravishankar et al. | |
| 2020/0065662 | A1* | 2/2020 | Srinivasaraghavan | G06N 3/08 |
| 2020/0074305 | A1* | 3/2020 | Cao | G06V 10/82 |
| 2020/0104704 | A1* | 4/2020 | Venkataramani | G06N 3/04 |
| 2020/0125930 | A1* | 4/2020 | Martin | G06N 3/082 |
| 2020/0160177 | A1 | 5/2020 | Durand et al. | |
| 2020/0210773 | A1 | 7/2020 | Li et al. | |
| 2020/0210888 | A1 | 7/2020 | Eldardiry et al. | |
| 2020/0293951 | A1* | 9/2020 | Johnston | G06F 16/906 |
| 2020/0302230 | A1* | 9/2020 | Chang | G06F 18/214 |
| 2021/0049473 | A1* | 2/2021 | Balachandar | G06F 18/285 |
| 2021/0182600 | A1* | 6/2021 | Yu | G06N 5/022 |
| 2021/0326685 | A1* | 10/2021 | Lee | G06N 3/065 |
| 2022/0012588 | A1* | 1/2022 | Rhee | G06N 3/04 |

FOREIGN PATENT DOCUMENTS

| | | |
|---|---|---|
| KR | 10-2019-0140619 A | 12/2019 |
| KR | 10-2093079 B1 | 3/2020 |
| KR | 10-2020-0047306 A | 5/2020 |

OTHER PUBLICATIONS

Nguyen, Trong Duc, et al. "Stratified random sampling from streaming and stored data." Published in Proceedings of the 22nd International Conference on Extending Database Technology (EDBT), Mar. 26-29, 2019 (Year: 2019).*

Shimizu, Ryota, et al. "Balanced mini-batch training for imbalanced image data classification with neural network." 2018 First International Conference on Artificial Intelligence for Industries (AI4I). IEEE, 2018. (Year: 2018).*

Vitter, Jeffrey S. "Random sampling with a reservoir." ACM Transactions on Mathematical Software (TOMS) 11.1 (1985): 37-57. (Year: 1985).*

Vitter, Jeffrey S. "Random Sampling with a Reservoir." *ACM Transactions on Mathematical Software (TOMS) 11.1* (1985): (21 pages in English).

Kirkpatrick, James, et al. "Overcoming catastrophic forgetting in neural networks." *Proceedings of the National Academy of Sciences* 114.13 (2017) (13 pages in English).

Chaudhry, Arslan, et al. "Riemannian Walk for Incremental Learning: Understanding Forgetting and Intransigence." *Proceedings of the European Conference on Computer Vision (ECCV).* 2018 (16 pages in English).

Aljundi, Rahaf et al. "Task-Free Continual Learning." *Proceedings of the IEEE/CVF Conference on Computer Vision and Pattern Recognition.* 2019 (10 pages in English).

Hayes, Tyler L., et al. "Memory Efficient Experience Replay for Streaming Learning." *2019 International Conference on Robotics and Automation (ICRA).* IEEE, 2019 (8 pages in English).

Kim, Chris Dongjoo, et al. "Imbalanced Continual Learning with Partitioning Reservoir Sampling." *European Conference on Computer Vision.* Springer, Cham, 2020 (19 pages in English).

Sadhukhan, Payel, et al. "Lattice and Imbalance Informed Multi-Label Learning." *IEEE Access 8* (2019) (15 pages in English).

Batista, Gustavo EAPA, et al. "A Study of the Behavior of Several Methods for Balancing Machine Learning Training Data." *ACM SIGKDD Explorations Newsletter 6.1* (2004) (10 pages in English).

Buda, Mateusz et al. "A systematic study of the class imbalance problem in convolutional neural networks." *Neural Networks* 106 (2018)(21 pages in English).

Chawla, Nitesh V., et al. "SMOTE: Synthetic Minority Oversampling Technique." *Journal of Artificial Intelligence Research 16* (2002) (37 pages in English).

Cui, Yin, et al. "Class-Balanced Loss Based on Effective Number of Samples." *Proceedings of the IEEE/CVF Conference on Computer Vision and Pattern Recognition.* 2019 (10 pages in English).

Huang, Chen, et al. "Learning Deep Representation for Imbalanced Classification." *Proceedings of the IEEE Conference on Computer Vision and Pattern Recognition.* 2016 (10 pages in English).

Lee, Soochan, et al. "A Neural Dirichlet Process Mixture Model for Task-Free Continual Learning." (2020) (22 pages in English).

Lin, Tsung-Yi, et al. "Microsoft coco: Common objects in context." *European Conference on Computer Vision.* Springer, Cham, 2014 (16 pages in English).

Chua, Tat-Seng, et al. "NUSE-WIDE: A Real-World Web Image Database from National University of Singapore." *Proceedings of the ACM International Conference on Image and Video Retrieval.* 2009 (9 pages in English).

Chaudhry, Arslan, et al. "On Tiny Episodic Memories in Continual Learning." 1902 (2019) (15 pages in English).

Aljundi, Rahaf et al. "Gradient based sample selection for online continual learning." *arXiv Preprint* (2019) (13 pages in English).

Caruana, Rich. "Multitask Learning." *Machine Learning 28.1* (1997) (35 pages in English).

Farquhar, Sebastian, and Yarin Gal. "Towards Robust Evaluations of Continual Learning." *arXiv Preprint* (2018) (16 pages in English).

* cited by examiner

METHOD AND DEVICE WITH RESERVOIR MANAGEMENT FOR NEURAL NETWORK ONLINE LEARNING

CROSS-REFERENCE TO RELATED APPLICATIONS

This application claims the benefit under 35 USC § 119(a) of Korean Patent Application No. 10-2020-0084775 filed on Jul. 9, 2020, and Korean Patent Application No. 10-2020-0166007 filed on Dec. 1, 2020, in the Korean Intellectual Property Office, the entire disclosures of which are incorporated herein by reference for all purposes.

BACKGROUND

1. Field

The following description relates to a method and device with reservoir management and neural network online learning.

2. Description of Related Art

The technological automation of processes such as recognition (for example, pattern recognition) may be implemented through processor-implemented neural network models, as specialized computational architectures, which, after substantial training, may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reservoir management method includes: in response to receiving input data to which label information is mapped, determining whether to add the input data to a reservoir based on a sampling probability; in response to determining to add the input data to the reservoir when the reservoir is filled, selecting candidate data to be removed from among sets of sample data included in the reservoir based on a target label distribution and a current label distribution of the reservoir, and removing the selected candidate data from the reservoir; and training a neural network model using sample data of the reservoir from which the selected candidate data is removed.

The determining of whether to add the input data to the reservoir may include: in response to the input data being excluded from an updating of the reservoir, skipping a remaining operation and waiting for subsequent input data of a data stream to be input.

The determining of whether to add the input data to the reservoir may include: determining the sampling probability for the input data based on an occurrence frequency of each class observed up to a current point in time in a data stream, a target memory allocation size for each class, and a weight for each class; and adding the input data to the reservoir based on the sampling probability determined for the input data.

The determining of the sampling probability may include: determining the weight for each class based on occurrence frequencies of classes in the data stream and one or more classes labeled to the input data.

The method may include: determining the target memory allocation size for each class based on a total memory size allocated for the training of the neural network model and a target partition ratio for each class in the target label distribution.

The method may include: determining the target label distribution indicating a target partition ratio for each class based on an occurrence frequency observed for each class in a data stream and an allocation exponent.

The removing of the selected candidate data may include: determining a distance vector corresponding to a difference between the target label distribution and the current label distribution; and selecting the candidate data based on the determined distance vector.

The determining of the distance vector may include: determining a distance value for each class from the distance vector based on a total number of labels labeled to all the sets of sample data included in the reservoir, a number of sets of data labeled with each class, and a target partition ratio corresponding to each class.

The removing of the selected candidate data may include: extracting, from the sets of sample data included in the reservoir, one or more first candidate samples labeled with a class stored greater than the target label distribution; and selecting, from the extracted first candidate samples, a second candidate sample labeled least with a class stored less than the target label distribution.

The extracting of the first candidate samples may include: determining a class with a greatest difference between the target label distribution and the current label distribution among a plurality of classes using a distance vector between the target label distribution and the current label distribution; and extracting, from the sets of sample data included in the reservoir, the first candidate samples labeled with the class with the greatest difference between the target label distribution and the current label distribution.

The selecting of the second candidate sample may include: selecting, from the first candidate samples, the second candidate sample by excluding data labeled with a label stored less than the target label distribution.

The removing of the selected candidate data may include: retrieving a third candidate sample that minimizes a distance difference from the target label distribution in response to being removed from the second candidate sample; and selecting the retrieved third candidate sample as the candidate data to be removed, and removing the selected third candidate sample.

The method may include: in response to data labeled with a new class different from classes observed in a data stream being received, expanding a label list of the reservoir.

The method may include: in response to determining to add the input data to the reservoir when the reservoir is not filled, skipping the selecting and the removing of the candidate data.

The method may include: in response to the input data being added to the reservoir, updating the current label distribution of the reservoir.

The input data may be an image, and the label information may include a label value indicating a class corresponding to a type of an object included in the image.

The method may include: indicating a result of recognizing an input image using the trained neural network model.

A non-transitory computer-readable storage medium may store instructions that, when executed by a processor, configure the processor to perform the method.

In another general aspect, a reservoir management device includes: a memory configured to store a reservoir including a plurality of sets of labeled sample data; and a processor configured to: in response to receiving input data to which label information is mapped, determine whether to add the input data to the reservoir based on a sampling probability; and in response to determining to add the input data to the reservoir when the reservoir is filled, select candidate data to be removed from among the sets of sample data included in the reservoir based on a target label distribution and a current label distribution of the reservoir, and remove the selected candidate data from the reservoir.

The device may be a mobile terminal comprising a receiver configured to receive a data stream including the input data.

In another general aspect, a mobile terminal includes: a receiver configured to receive a data stream including input data to which label information is mapped; a memory configured to store a reservoir including a plurality of sets of labeled sample data and a neural network model; and a processor configured to: in response to receiving the input data to which the label information is mapped, determine whether to add the input data to the reservoir based on a sampling probability; in response to determining to add the input data to the reservoir when the reservoir is filled, select candidate data to be removed from among the sets of sample data included in the reservoir based on a target label distribution and a current label distribution of the reservoir, and remove the selected candidate data from the reservoir; and train the neural network model using sample data of the reservoir from which the selected candidate data is removed.

Other features and aspects will be apparent from the following detailed description, the drawings, and the claims.

Figure 1:
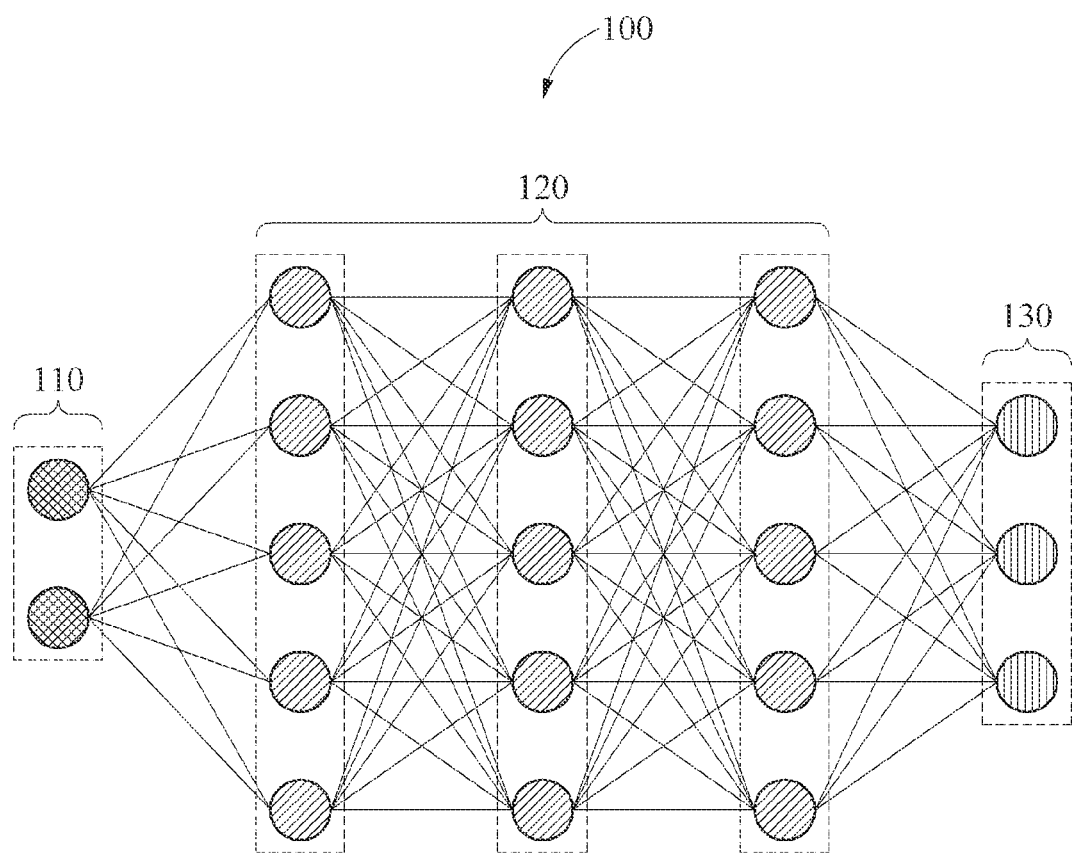
FIG. 1 illustrates an example of a neural network model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of a neural network model.

A neural network model 100 may be an example of a deep neural network (DNN). The DNN may include a fully-connected network (FCN), a deep convolutional network (DCN), a recurrent neural network (RNN), and/or the like. The neural network model 100 may map input data and output data that are in a nonlinear relationship based on deep learning to perform object classification, object recognition, speech recognition, image recognition, and/or the like. Deep learning, which is a machine learning method used to solve an issue such as image or speech recognition from a big data set, may map input data and output data to each other through supervised or unsupervised learning.

In this disclosure, recognition may include identification of data. The identification may refer to classification that determines a label indicated by input data from among a plurality of labels. For example, each label may indicate a class (e.g., identity (ID)) of a registered user). For example, through the identification, whether a user included in input data is a male or female user may be indicated. However, examples of a class are not limited to the foregoing example. For example, when input data is an image, a class may indicate a type of an object included in the image. A type of an object may include, for example, a human, an animal, a type of animals (e.g., dog, cat, etc.), a type of things (e.g., fire extinguisher, hair drier, etc.), a type of vehicles (e.g., bicycle, car, etc.), and/or the like. A class may vary depending on a design and an environment in which recognition is performed.

Referring to FIG. 1, the neural network model 100 may include an input layer 110, a hidden layer 120 (e.g., one or more hidden layers), and an output layer 130. Each of the input layer 110, the hidden layer 120, and the output layer 130 may include a plurality of nodes.

Although it is illustrated in FIG. 1 that the hidden layer 120 includes three layers for the convenience of description, the hidden layer 120 may include various numbers of layers. Although it is illustrated in FIG. 1 that the neural network model 100 includes a separate input layer to receive input data, the input data may be input directly to the hidden layer 120. In the neural network model 100, nodes of a layer other than the output layer 130 may be connected to nodes of a subsequent layer through links for transmitting an output signal. The number of links connecting the nodes of the layer to the nodes of the subsequent layer may correspond to the number of the nodes of the subsequent layer.

To each node included in the hidden layer 120, an output of an activation function associated with weighted inputs of nodes included in a previous layer may be input. The weighted inputs may be obtained by multiplying inputs of nodes included in the previous layer by a weight. The weight may be referred to as a parameter of the neural network model 100. The activation function may include, for example, sigmoid, hyperbolic tangent (tan h), and/or rectified linear unit (ReLU), by which nonlinearity of the neural network model 100 may be formed. To each node included in the output layer 130, weighted inputs of nodes included in a previous layer may be input.

In an example, when input data is given, the neural network model 100 may calculate a function value based on the number of classes to be identified in the output layer 130 through the hidden layer 120, and identify the input data as a class having a greatest function value.

When the neural network model 100 has a sufficiently large width and depth, the neural network model 100 may have a capacity sufficient to implement a function. When the neural network model 100 is trained with a sufficiently great amount of training data through a suitable training (or learning) process, it is possible to achieve an optimal recognition performance.

Hereinafter, managing a reservoir that stores or includes sample data for training a neural network model will be described in detail.

Figure 2:
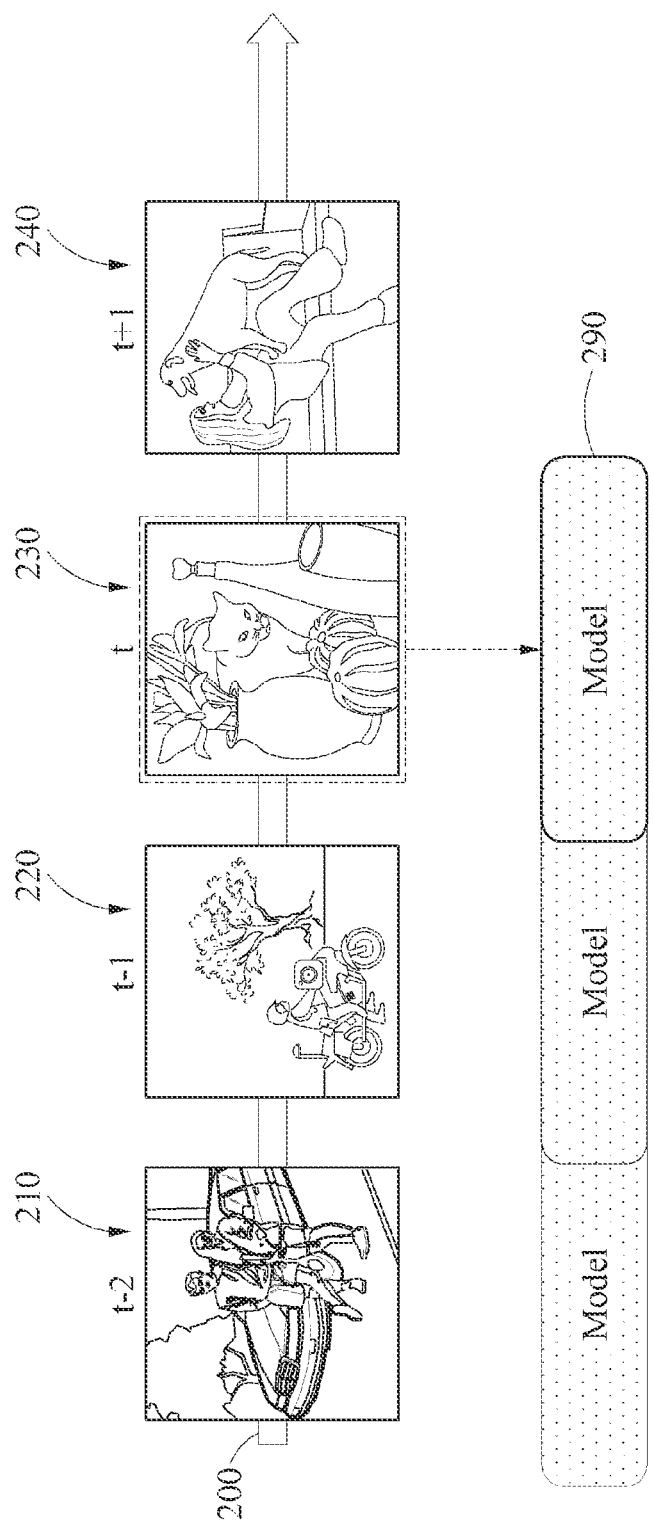
FIG. 2 illustrates an example of a data stream and an example of training a neural network model based on the data stream.
Figure 3:
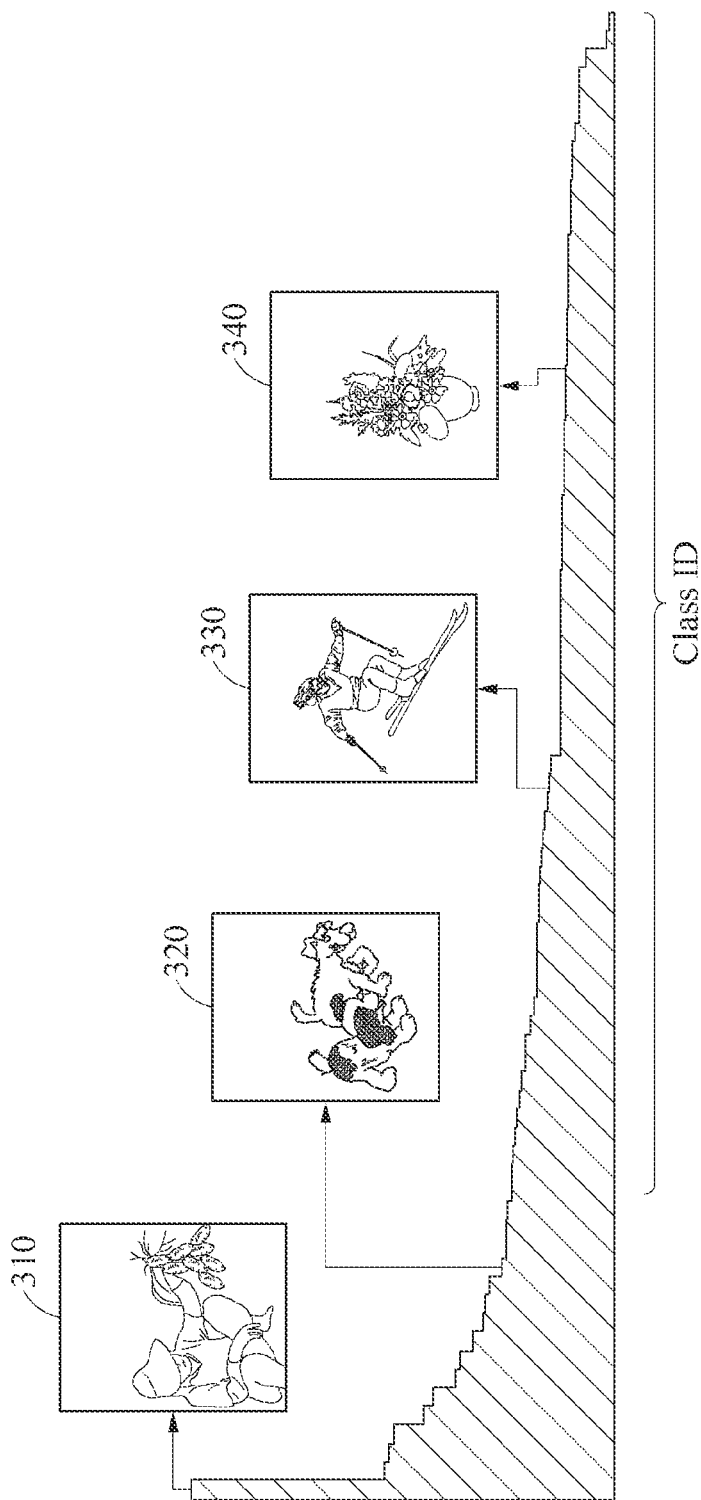
FIG. 3 illustrates an example of an imbalanced label distribution in a data stream.

FIG. 2 illustrates an example of a data stream and an example of training a neural network model based on the data stream. FIG. 3 illustrates an example of an imbalanced label distribution in a data stream.

A reservoir management device may collect and manage training data for continual learning or training of a neural network model 290. The reservoir management device may receive a time-series data stream 200 to collect the training data. When a typical neural network model learns the data stream 200 that is received in real time, the typical neural network model may forget about what is learned from previous data of the data stream 200, which may be referred to as catastrophic forgetting. In the example of FIG. 2, a series of images is illustrated as an example of the data stream 200. There are people and a vehicle in a t−2th frame image 210, a person and a bicycle in a t−1th frame image 220, a cat in a t-th frame image 230, and a person and a dog in a t+1th frame image 240. For example, the neural network model 290 that is trained using data up to the t−1th frame image 220 may accurately identify a human and another object. However, the typical neural network model that is additionally trained using the t-th frame image 230 may identify a cat, but its performance in recognizing a human may be degraded due to the additional training. To prevent such catastrophic forgetting, a replay-based method of one or more embodiments may be used. For example, the neural network model 290 of one or more embodiments may learn, along with a current sample, a portion of previous data remembered in a memory while sampling it during online learning. Such replay-based learning of one or more embodiments may effectively prevent the catastrophic forgetting when a label distribution is balanced.

The time-series data stream 200 may be one of the most natural input types based on a time law. The data stream 200 may be a flow of information, such as, for example, text classification, questions and answers, language instruction, translation, object detection, subtitle caption, video representation, and the like. The data stream 200 is described herein as an image in a vision field, and label information is described herein as including a label value indicating a class corresponding to a type of an object included in the image. However, a data type of the data stream 200 is not limited thereto, and a language data stream is also applicable.

In the time-series data stream 200, a majority of samples may tend to be of a minority of classes, and a minority of samples may tend to be of a majority of classes. FIG. 3 illustrates an example distribution of class IDs labeled to an image. Most images may be labeled with a class 310 indicating a human and a class 320 indicating an animal (e.g., dog) familiar with humans. In contrast, samples labeled with a class 330 indicating skiing and a class 340 indicating a flowerpot may be relatively minor. An imbalanced label distribution in which a portion of classes is labeled at a high incidence and another portion of the classes is labeled at a low incidence may be referred to as a long-tailed distribution. In stochastic gradient descent (SGD)-based learning, an imbalance in a minibatch may allow major classes to dominate a gradient update, and thus minor classes may be disregarded in the learning as a result. This may be referred to as gradient dominance. In addition, due to a lack of data, minor classes may be under-represented compared to major classes, which is referred to as under-representation of minor classes. Due to the gradient dominance and the under-representation described above, the long-tailed distribution may intensify the catastrophic forgetting of minor labels.

In an example, the reservoir management device of one or more embodiments may provide a reservoir having a balanced label distribution to prevent the catastrophic forgetting of minor labels in the data stream 200 having the long-tailed distribution. The reservoir management device may allocate a sufficient memory space even to moderate and minor labels, rather than major labels, in a limited and fixed memory space. Thus, the reservoir management device may provide the reservoir having the balanced label distribution for training or learning of the neural network model 290. Hereinafter, partitioning reservoir sampling (PRS) that is applicable to a data stream (e.g., data stream 200) will be described in detail.

Figure 4:
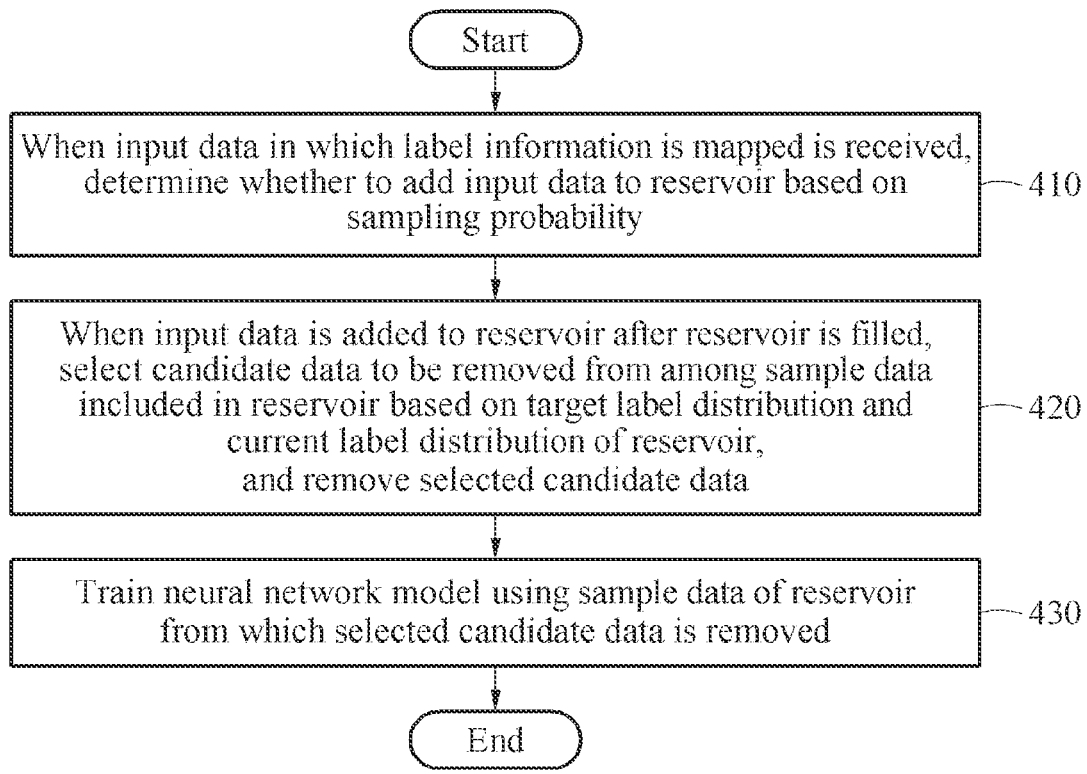
FIG. 4 illustrates an example of a reservoir management method for neural network online learning.

FIG. 4 illustrates an example of a reservoir management method for neural network online learning.

Referring to FIG. 4, in operation 410, when input data to which label information is mapped is received, the reservoir management device may determine whether to add the input data to a reservoir based on a sampling probability. The reservoir may refer to a memory space defined and/or allocated to store sample data for training a neural network model. In this disclosure, a memory size allocated to the reservoir may be fixed.

The reservoir management device may sequentially obtain data of a data stream. The data stream may refer to a stream including a series of data sets. Each data set (X; Y) may include input data X and label information Y mapped to the input data X. The label information Y may be a label vector including label values indicating one or more classes to which the input data X belongs. For example, in a case in which the label information Y includes a label value indicating a class, it is described herein that the class is labeled to the input data X and/or the input data X is labeled with the class.

For example, when t-th input data corresponding to a frame t of a current time point is received, the reservoir management device may calculate a sampling probability for the t-th input data and determine whether to add the t-th input data based on the calculated sampling probability.

Hereinafter, non-limiting examples of input data, label information, and a sampling probability will be described in detail below with reference to FIG. 5.

To each data of the data stream received by the reservoir management device, the label information may be given in advance. The label information of data may be assigned by a human or by another machine learning model, and/or may be predetermined. To data, a label value corresponding to at least one class may be labeled. Although a human and an animal are described as examples of a class for the convenience of description, the class may not necessarily be an explicit class, but be an implicit class.

The reservoir management device may obtain the data stream and may not need to obtain other information (e.g., task boundary or total number of classes) associated with a future data stream during management of the reservoir and training of the neural network model. The reservoir management device may distribute a memory to all classes in a balanced way without auxiliary task information. For example, in a case in which the reservoir management device receives data labeled with a new class different from classes previously observed in the data stream, the reservoir management device may expand a label list of the reservoir. The label list may be a list of labels corresponding to classes observed in the sample data stored in the reservoir. The reservoir management device may add a new label to the existing label list. Thus, irrespective of the total number of classes, the reservoir management device may secure a memory space for the new class.

In operation 420, when the input data is added to the reservoir after the reservoir is filled, the reservoir management device may select candidate data to be removed from among the sets of sample data included in the reservoir based on a target label distribution and a current label distribution of the reservoir, and may remove the selected candidate data from the reservoir. The sample data may refer to data that is sampled and retained in the reservoir to train the neural network model. The candidate data may refer to a candidate that needs (or is determined) to be removed for a balanced distribution of major labels, moderate labels, and minor labels in the reservoir. The target label distribution may include a target partition ratio for each class. The current label distribution may refer to a distribution of the number of sets of sample data labeled with corresponding classes in the reservoir for each class. When the input data is added to the reservoir, the reservoir management device may update the current label distribution of the reservoir. Hereinafter, non-limiting examples of the selecting of the candidate data will be described in further detail below with reference to FIGS. 6 through 8.

However, when the input data is added to the reservoir before the reservoir is filled, the reservoir management device may skip the operations of selecting candidate data and removing the selected candidate data. That is, the reservoir management device may skip operation 420 as long as there is a remaining space in the reservoir, and may continue to add sample data to the reservoir.

The reservoir management device may manage the reservoir by repeatedly performing operation 410 of adding input data and operation 420 of removing sample data.

In operation 430, the reservoir management device may train the neural network model using sample data of the reservoir from which the selected candidate data is removed. For example, the reservoir management device may train the neural network model using training data including the sample data that is previously sampled in the reservoir and the input data that is newly added to the reservoir. The reservoir management device may train the neural network model based on a loss (e.g., soft-margin loss) between a training output and an output calculated by applying the neural network model to a training input of the training data. The reservoir management device may update a parameter (e.g., connection weight) of the neural network model through a gradient descent method until the calculated loss is minimized or reaches a threshold loss.

The reservoir management device of one or more embodiments may provide a neural network model having a high recognition performance and a high memory efficiency through replay-based continual learning such as operation 430. In addition, the reservoir management device of one or more embodiments may provide training of a neural network model that maintains a recognition performance in a task-free continual setting without a task that does not require an explicit task label.

In addition, dissimilar to a typical training data management method that performs oversampling and undersampling after all sets of training data are obtained, which is applicable only to offline training or learning, the reservoir management device of one or more embodiments may also be applicable to online training or learning of a neural network model. The reservoir management device of one or more embodiments may permanently maintain a balanced label distribution while receiving online data for training or learning.

Figure 5:
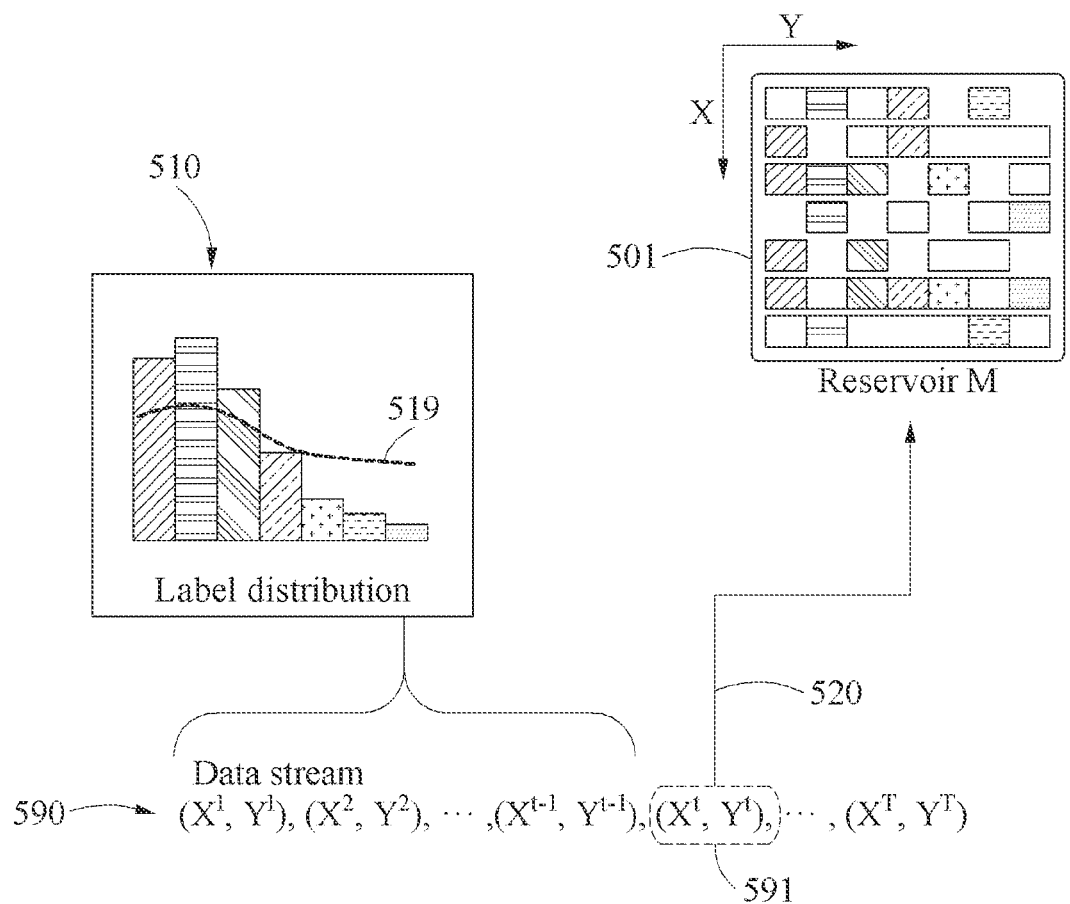
FIG. 5 illustrates an example of a label distribution based on an obtained data stream and an example of sample addition to a reservoir.

FIG. 5 illustrates an example of a label distribution based on an obtained data stream and an example of sample addition to a reservoir.

Referring to FIG. 5, the reservoir management device may receive a data stream 590. The data stream 590 may include a series of sets of data that are distinguished for each frame, and each set of data may be received with label information mapped thereto. In the example of FIG. 5, the data stream 590 is illustrated as including first through Tth frames, and the Tth frame may correspond to a future time point at which data collection is to be terminated. In the example, an incoming data set at a current time point will be described as a t-th data set, and a t-th frame may correspond to the current time point. In this example, T denotes an integer greater than or equal to 1, and t denotes an integer greater than or equal to 1 and less than or equal to T.

The t-th data set may include t-th input data $X^t$ 591 and label information $Y^t$ mapped to the t-th input data $X^t$ 591. The label information $Y^t$ may be a multi-hot label vector that indicates a label value corresponding to a class labeled to the t-th input data $X^t$ 591 among u classes. Here, u denotes a unique number of classes observed up to the current time point (e.g., t-th frame) or a previous time point (e.g., t−1th frame) in the data stream 590, and may be an integer greater than or equal to 1. For example, the label information $Y^t$ may be represented as $Y^t = [y_1^t, \ldots, y_i^t, \ldots, y_u^t]$, in which i denotes an integer greater than or equal to 1 and less than or equal to u. $y_i^t$ denotes a label value indicating whether an i-th class is labeled to the t-th input data $X^t$ 591 or not. For example, it may have a first bit value (e.g., 1) when the i-th class is labeled to the t-th input data $X^t$ 591, and a second bit value (e.g., 0) when the i-th class is not labeled to the t-th input data $X^t$ 591. However, a label value may vary according to a design, and thus not be limited to the foregoing example. In the following, $y_i^t$ will also be expressed as $y_i$ for the convenience of description because the t-th frame corresponding to the current time point is the focus of consideration in the following.

For example, one input data $X^t$ may be an image, and corresponding label information $Y^t$ may indicate a type of an object included in the image. In this example, when classes observed up to a t-th frame are {human, animal, vehicle} and the input data $X^t$ includes a human and a vehicle, the label information $Y^t$ may be [1, 0, 1]. However, the input data $X^t$, the label information $Y^t$, and the classes are not limited to the foregoing example. For another example, the input data $X^t$ may be speech data, and classes and the label information $Y^t$ may be classified and determined based on a type of the data. When a new class is observed in a frame, the reservoir management device may add the class to a label list which is a list of labels in a reservoir 501, thereby updating the label list. In the foregoing example, the label list may be {human, animal, vehicle}.

While receiving the data stream 590 for online learning, the reservoir management device may manage the label list of labels (e.g., 1, . . . , u) indicating classes observed up to the current time point. The reservoir management device may determine an ideal target partition ratio $p_i$ of each class with respect to i∈[u], as represented by Equation 1 below, for example.

$$p_i = \frac{n_i^\rho}{\sum_j n_j^\rho} \qquad \text{Equation 1}$$

The reservoir management device may determine a target label distribution 519 that indicates the target partition ratio $p_i$ for each class based on an occurrence frequency $n_i$ observed for each class in the data stream 590 and an allocation exponent ρ. The target label distribution 519 may be a set of target partition ratios, for example, $[p_1, \ldots p_i, \ldots p_u]$. As represented by Equation 1 above, the reservoir management device may calculate a target partition ratio $p_i$ for an i-th class to be a ratio of a value obtained by raising an occurrence frequency $n_i$ observed for the i-th class to the allocation exponent ρ-th power ($n_i$ raised to the ρ-th power) to a sum of values obtained by raising the occurrence frequency $n_j$ observed for each class to the allocation exponent ρ-th power ($n_j$ raised to the ρ-th power). Here, j denotes an index indicating a set of classes observed up to the current time point in the data stream 590, and may be an integer greater than or equal to 1 and less than or equal to u.

The allocation exponent ρ may be a design parameter used to set a target distribution ratio for each class, and be a real number greater than or equal to 0 and less than or equal to 1. The allocation exponent ρ may also be referred to as an exponent parameter. A non-limiting example of a partitioning design based on such an allocation exponent ρ will be described hereinafter with reference to FIG. 9. Here, $n_i$ denotes an occurrence frequency observed for an individual class up to the current time point in the data stream 590, and may indicate running statistics by each class. The reservoir management device may record the occurrence frequency $n_i$ for each class observed up to the current frame in the data stream 590. For example, the reservoir management device may calculate the occurrence frequency $n_i$ for a certain class, to be a ratio of the number of sets of data labeled with the certain class to a total number of sets of data up to the current frame. The reservoir management device may re-calculate the occurrence frequency $n_i$ for each class when receiving input data (e.g., t-th frame) or before receiving input data (e.g., t−1th frame), and update the target partition ratio $p_i$ for each class.

The target label distribution 519 may be a set of target partition ratios $p_i$ of classes, and a label distribution 510 of the data stream 590 may be a set of occurrence frequencies $n_i$ observed for the individual classes in the data stream 590. The label distribution 510 may be a distribution that is irrespective of sample data that is sampled and stored in the reservoir 501, but may indicate statistics accumulated from previous records in the data stream 590 that are input up to the current time point. In the label distribution 510 of the data stream 590, a horizontal axis indicates a class, and a vertical axis indicates a frequency for each class. The reservoir management device may determine the target label distribution 519 based on Equation 1 above, and thus may partition a memory space allocated in the reservoir 501 for each class based on the determined target label distribution 519. In the target label distribution 519, a target partition ratio of each class may be a ratio of a memory space to be allocated to a corresponding class compared to a total memory space by the reservoir management device. Although the target label distribution 519 is illustrated in FIG. 5 as having a different target partition ratio for each class, the ratio may be the same for each class when the allocation exponent ρ is 0.

The reservoir management device may determine a target memory allocation size $m_i$ for each class based on a total memory size m allocated for training of a neural network model and the target partition ratio $p_i$ for each class of the target label distribution 519. The target memory allocation size $m_i$ may be m·$p_i$ ($m_i$=m·$p_i$), in which m denotes the total memory space allocated to the reservoir 501 and $p_i$ denotes the target partition ratio. A partition of the reservoir 501 may be represented as a vector M=[$m_1$; . . . ; $m_u$]. The reservoir management device may determine the target memory allocation size $m_i$ when receiving the t-th input data 591 and/or before receiving the t-th input data 591 (e.g., at each of first through Tth frames).

The reservoir management device may perform an addition operation 520 to add the t-th input data 591. The reservoir management device may determine whether to perform the addition operation 520 based on a sampling probability. The sampling probability may refer to a probability that currently incoming input data is to be added to the reservoir 501, and the sampling probability may be calculated as a value in which an opportunity to be added to the reservoir 501 is fairly given to each class. The reservoir management device may calculate the sample probability as represented by Equation 2 below, for example.

$$s = \sum_{i \in \{1,\ldots,u\}} \frac{m_i}{n_i} \cdot w_i, \text{ where } w_i = \frac{y_i e^{-n_i}}{\sum_{j=1} y_j e^{-n_j}} \quad \text{Equation 2}$$

As represented by Equation 2 above, the reservoir management device may calculate a sampling probability s for input data based on an occurrence frequency $n_i$ for each class observed up to a current time point in the data stream 590, a target memory allocation size $m_i$ for each class, and a weight $w_i$ for each class. For example, the reservoir management device may calculate, as the sampling probability s for the input data, a sum of results of multiplying, by the weight $w_i$ for each class, a ratio of the target memory allocation size $m_i$ for each class to the occurrence frequency $n_i$ for each class.

The reservoir management device may determine the weight $w_i$ for each class based on the occurrence frequency $n_i$ for classes and on classes labeled to the input data. In Equation 2 above, $y_i$ denotes a label value indicating whether an i-th class is labeled to the currently incoming input data. $y_i$ may have a first bit value (e.g., 1) as a scalar value when the i-th class is labeled to the input data, and a second bit value (e.g., 0) when the i-th class is not labeled to the input data. The reservoir management device may calculate the weight $w_i$ based on negative softmax, and thus may sufficiently store minor classes in the reservoir 501. For example, a weight for the i-th class may be calculated to be a ratio of a result of multiplying a label value $y_i$ of a corresponding label by a value obtained by raising a natural number e to the power of a negative value of an occurrence frequency $n_i$ for the label to a sum of results of multiplying label values $y_j$ of corresponding labels of the input data by a value obtained by raising the natural number e to the power of a negative value of an occurrence frequency $n_j$ of the labels.

In Equation 2 above, $m_i/n_i$ denotes a ratio of a target memory size allocated to the i-th class to an occurrence frequency of the i-th class in the data stream 590. When a value of $m_i/n_i$ is small, the i-th class may be a major class and a sampling probability may thus decrease. When the value of $m_i/n_i$ is large, the i-th class may be a minor class and the sampling probability may thus increase. The weight $w_i$ for the i-th class of the input data may have a weight value only when the i-th class is labeled to the input data (e.g., when $y_i$ is 1 ($y_i$=1)), and the weight $w_i$ may have an emphasized value when the i-th class is a minor class by negative softmax.

The reservoir management device may add the input data to the reservoir 501 based on the sampling probability s calculated for the input data. The reservoir management device may or may not add the input data stochastically based on the sampling probability s. For example, the reservoir management device may add the input data with the sampling probability s, or discard the input data with a remaining probability 1-s. In this example, a sum of the sampling probability s and the remaining probability 1-s may be 1.

Thus, the reservoir management device of one or more embodiments may manage a memory to be allocated to each class in a balanced manner with respect to a fixed memory size m. The reservoir management device may maintain a memory allocation space for each class to be $\Sigma_{i=1}^{u} m_i \leq m$ with respect to the fixed memory size m.

In the reservoir 501 illustrated in FIG. 5, a vertical x-axis indicates sample data stored therein, and a horizontal y-axis indicates a class labeled to each sample data. For sets of data of the sample data to which the same class is labeled, the same pattern slot is marked as illustrated. For example, sample data in a first row, a third row, a fourth row, and a seventh row may be data to which a class of a second column is labeled.

When excluding the input data from an update of the reservoir 501, the reservoir management device may skip a remaining operation and then wait for subsequent input data of the data stream 590 to be input. In a case in which input data is not newly sampled, a space in the reservoir 501 may not be insufficient, and thus the sample data previously stored in the reservoir 501 may not need to be removed. Thus, the reservoir management device may skip an operation of selecting candidate data to be removed from among the sample data, for example, a non-limiting example operation to be described hereinafter with reference to FIGS. 6 through 8.

However, in a case in which input data is added to the reservoir 501 when a space in the reservoir 501 is insufficient, the reservoir management device may perform the non-limiting example operation to be described hereinafter with reference to FIGS. 6 through 8.

Figure 6:
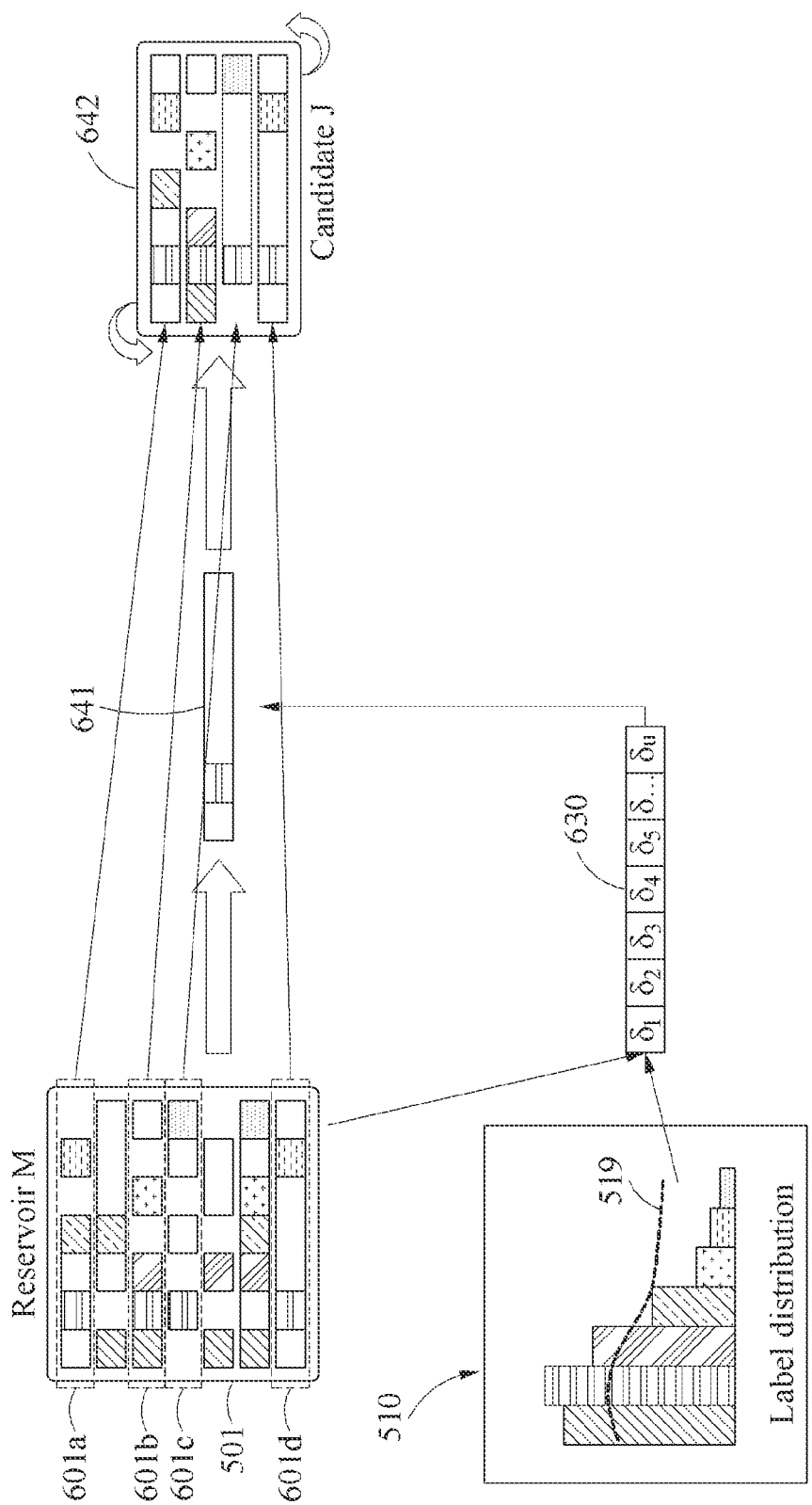
FIGS. 6 through 8 illustrate examples of extracting candidate data to be removed from sets of sample data stored in a reservoir.
Figure 7:
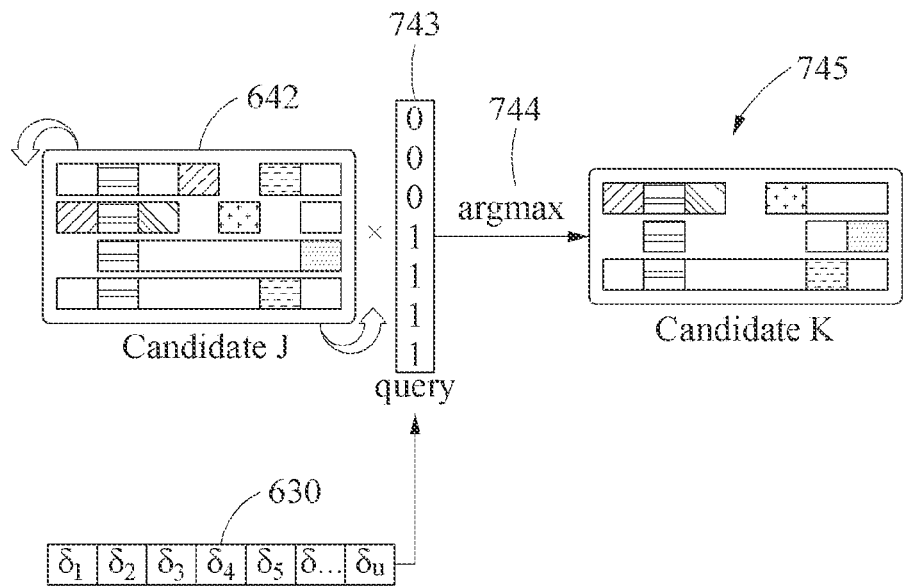
Figure 8:
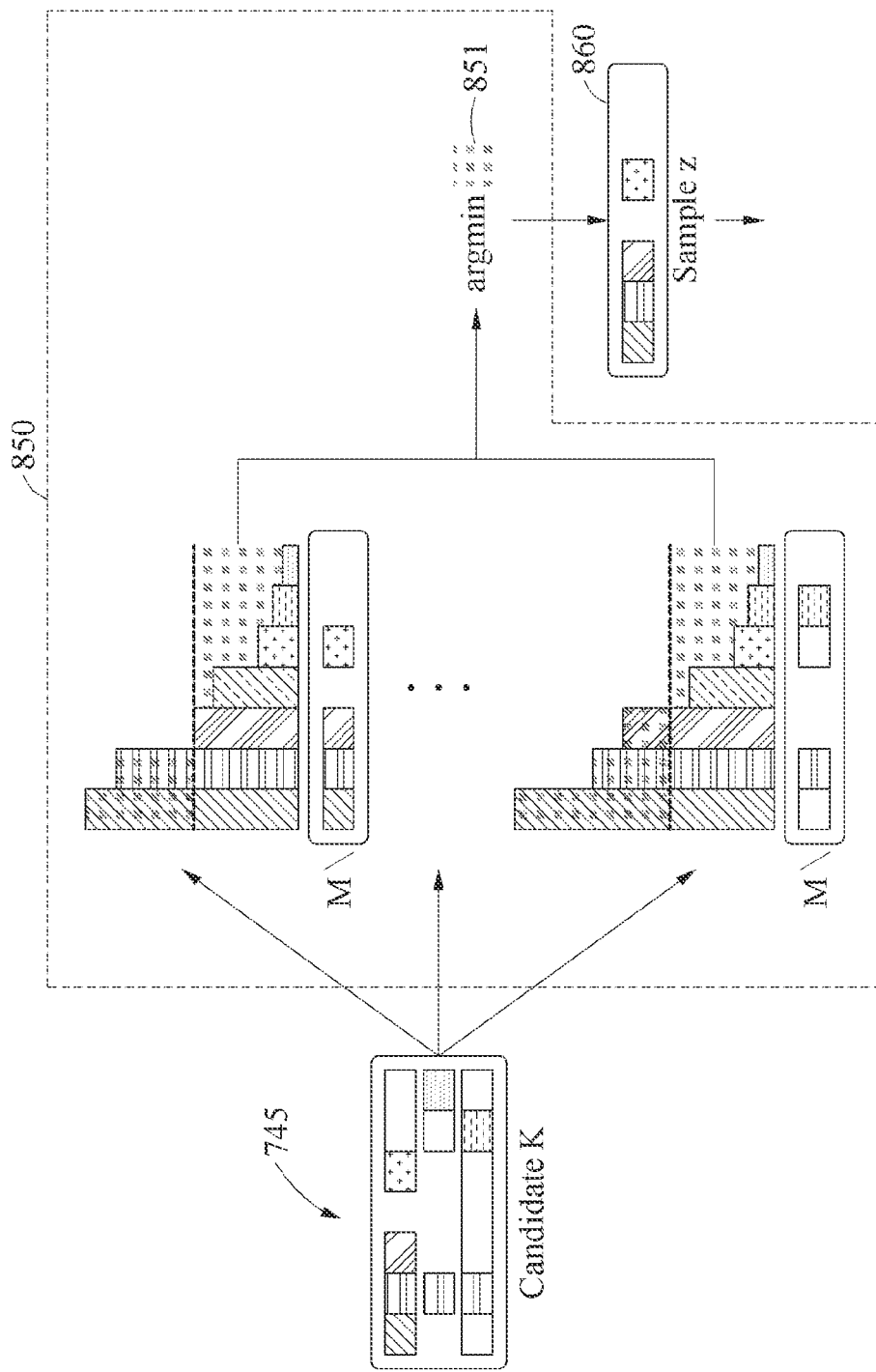

FIGS. 6 through 8 illustrate examples of extracting candidate data to be removed from among sets of sample data stored in a reservoir.

In an example, the reservoir management device may calculate a distance vector corresponding to a difference between a target label distribution and a current label distribution. The reservoir management device may select candidate data based on the calculated distance vector. FIGS. 6 through 8 illustrate an example of how candidate data that is a target to be removed is refined using a distance vector. The order of an operation to be described with reference to FIG. 6 and an operation to be described with reference to FIG. 7 may be changed.

FIG. 6 illustrates an example of primarily extracting candidate data to be removed using a distance vector.

Referring to FIG. 6, a distance vector 630 is a vector associated with a distance between a current label distribution of a reservoir 501 and an ideal target label distribution 519, and may include a distance value for each class. The current label distribution may be a distribution of labels in the reservoir 501. The current label distribution may be similar to a label distribution 510 of a data stream in terms of initial tendency, but may become different as the reservoir management device repeats addition and/or exclusion of samples. The current label distribution may become gradually similar to the target label distribution 519.

For example, a distance value $\delta_i$ between the current label distribution and the target label distribution 519 for an i-th class may be calculated as represented by Equation 3 below, for example.

$$\delta_i = l_i - p_i \cdot \sum_j l_j \qquad \text{Equation 3}$$

The reservoir management device may calculate the distance value $\delta_i$ in the distance vector 630 for the i-th class based on a total number $\sum_j l_j$ of labels that are labeled to all sets of sample data stored in the reservoir 501, the number $l_i$ of sets of data to which the i-th class is labeled, and a target partition ratio $p_i$ corresponding to the class. $l_i$ denotes the number of sets of data to which the i-th class is labeled among the sets of sample data currently stored in the reservoir 501. The current label distribution may be a set of $l_i$ that indicates a distribution of the number of sets of sample data to which a corresponding class is labeled in the reservoir 501 for each class. For example, the reservoir management device may obtain the distance value $\delta_i$ corresponding to the i-th class by subtracting, from the number of $l_i$ of the samples corresponding to a corresponding label, a result obtained by applying the target partition ratio $p_i$ corresponding to the label to the total sum $\sum_j l_j$ of the number of samples of each label in the reservoir 501. As shown, a distance value of the distance vector 630 may be determined based on the number of sets of data to which a class is labeled, not on a memory size of the reservoir. Thus, the distance value may be used to manage to the reservoir 501 with a balanced class distribution. For example, when a distance value for an i-th class is a positive number that is greater in value, the class may be construed as occupying a greater memory space than a target. Conversely, when the distance value for the i-th class is a negative number that is greater in value, the class may be construed as occupying a smaller memory space than the target.

The reservoir management device may extract one or more first candidate samples J 642 to which a class stored more than the target label distribution 519 is labeled from the sets of sample data stored in the reservoir 501 using the distance vector 630. For example, the reservoir management device may determine a class having a greatest difference between the target label distribution 519 and the current label distribution among a plurality of classes using the distance vector 630 between the target label distribution 519 and the current label distribution (e.g., the class of the second column in FIG. 6). The reservoir management device may extract, from the sample data of the reservoir 501, the first candidate samples J 642 to which the class having the greatest difference between the target label distribution 519 and the current label distribution is labeled. For example, the reservoir management device may extract the first candidate samples J 642 as represented by Equation 4 below, for example.

$$J = \{i | M_i^y \cdot d^T > 0\} \qquad \text{Equation 4:}$$

In Equation 4, $M_i^y$ denotes a multi-hot vector indicating a multi-class label of an i-th element present in the reservoir 501. The reservoir management device may select a class d having a greatest distance value from the target label distribution 519 by applying a softmax function to the distance vector 630. For example, the reservoir management device may sample the single class d through softmax($\delta$) to reduce sample data having a label that is excessively present. In this example, softmax($\delta$) may be highly biased to a class having a maximum distance value. d denotes a one-hot vector 641 of which a d-th element is 1. The reservoir management device may extract the first candidate samples J 642 to which the class d is labeled.

In the example of FIG. 6, the reservoir management device may calculate the distance vector 630 based on the target label distribution 519 and the current label distribution of the reservoir 501. In the distance vector 630, a second class (e.g., the class of the second column) may represent the highest frequency, and may have a greatest distance value from the target label distribution 519. The reservoir management device may determine the one-hot vector d from the distance vector 630. The reservoir management device may extract, as the first candidate samples J 642 from the reservoir 501, first through fourth sets of sample data 601a, 601b, 601c, and 601d that match the one-hot vector d.

FIG. 7 illustrates an example of extracting a second candidate sample K from first candidate samples J.

Referring to FIG. 7, the reservoir management device may select a second candidate sample K 745 to which a class stored less than a target label distribution is the least labeled from among one or more first candidate samples J 642. The reservoir management device may select the second candidate sample K 745 by excluding data to which a label stored less than the target label distribution is labeled from among the first candidate samples J 642. That is, the reservoir management device may retain or store sample data to which a minor class is labeled. As represented by Equation 5 below, for example, the reservoir management device may generate a query vector 743 based on the distance vector 630, exclude data having a minor label from the first candidate samples J 642 using the generated query vector 743, and select data remained after the excluding as the second candidate sample K 745.

$$K = \{n^* | n^* = \underset{n \in J}{\mathrm{argmax}}(\neg Y^n \cdot q)\}, \qquad \text{Equation 5}$$

-continued $$\text{where } q = \left\{ q_i \mid q_i = \begin{cases} 0 \text{ if } \delta_i > 0 \\ 1 \text{ else} \end{cases} : i \in \{1, \ldots, u\} \right\}$$

In Equation 5, q denotes the query vector 743, which is a vector including a query value of 0 when a distance value corresponding to an i-th class exceeds 0 and a query value of 1 when the distance value is less than or equal to 0. The query vector 743 q may also be a vector that is set to search for a class that does not occupy much a memory in a reservoir. n denotes an index indicating data extracted as the first candidate samples J 642, and $Y^n$ denotes a multi-hot vector as label information labeled to n-th data among the first candidate samples J 642. In addition, $\neg Y^n$ denotes a negation of $Y^n$, and a negation operation may change an element having a value of 0 in the multi-hot vector to have a value of 1, and change an element having a value of 1 to have a value of 0. $\neg Y^n$ denotes a class that is not labeled to the n-th data among the first candidate samples J 642.

Through argmax 744 of Equation 5 above, the reservoir management device may search for the n-th data that maximizes a product of a multiplication between queries indicating a class that is not labeled to the n-th data of the first candidate samples J 642 and classes less occupying a memory. Thus, the reservoir management device may search for data having the classes (e.g., minor classes) that do not occupy greatly the memory from the first candidate samples J 642, and select the second candidate sample K 745.

The operations described above with reference to FIGS. 6 and 7 are not necessarily performed in sequential order as described above, but may be performed in reserve order. For example, the reservoir management device may extract candidate samples by applying argmax 744 of Equation 5 to the sample data in the reservoir, and apply the vector d that is based on softmax($\delta$) of Equation 4 to each of the extracted candidate samples. The reservoir management device may thereby secondarily extract a candidate sample.

FIG. 8 illustrates an example of determining final candidate data.

Referring to FIG. 8, the reservoir management device may search for a third candidate sample that minimizes a distance difference from a target label distribution when being removed from among second candidate samples K 745. The reservoir management device may select the retrieved third candidate sample as candidate data z 860, and remove the candidate data z 860.

For example, through Equation 6 below, the reservoir management device may determine the candidate data z 860 that enables an ideal ratio of classes after it is removed.

$$z = \underset{k \in K}{\operatorname{argmin}} \sum_{i \in \{1,\ldots,u\}} \left| C_{ki} - p_i \cdot \sum_{j \in \{1,\ldots,u\}} C_{kj} \right|, \text{ where } C_{ki} = \sum_{n \in M \setminus k} y_i^n \quad \text{Equation 6}$$

In Equation 6, $C_{ki}$ denotes the number of sets of data labeled with an i-th class that is to be retained in a reservoir when k-th data of the second candidate samples K 745 is removed. $|C_{ki} - p_i \cdot \Sigma_{j \in \{1, \ldots, u\}} C_{kj}|$ denotes a distance value, for an i-th class, between a target label distribution and a current label distribution when the k-th data is removed. That is, the reservoir management device may search for the k-th data that minimizes a sum 851 of distance differences from the desired target label distribution when the k-th data is removed, through argmin 850, to determine the candidate data z 860.

The reservoir management device may then remove the finally selected candidate data z 860 from the reservoir.

Figure 9:
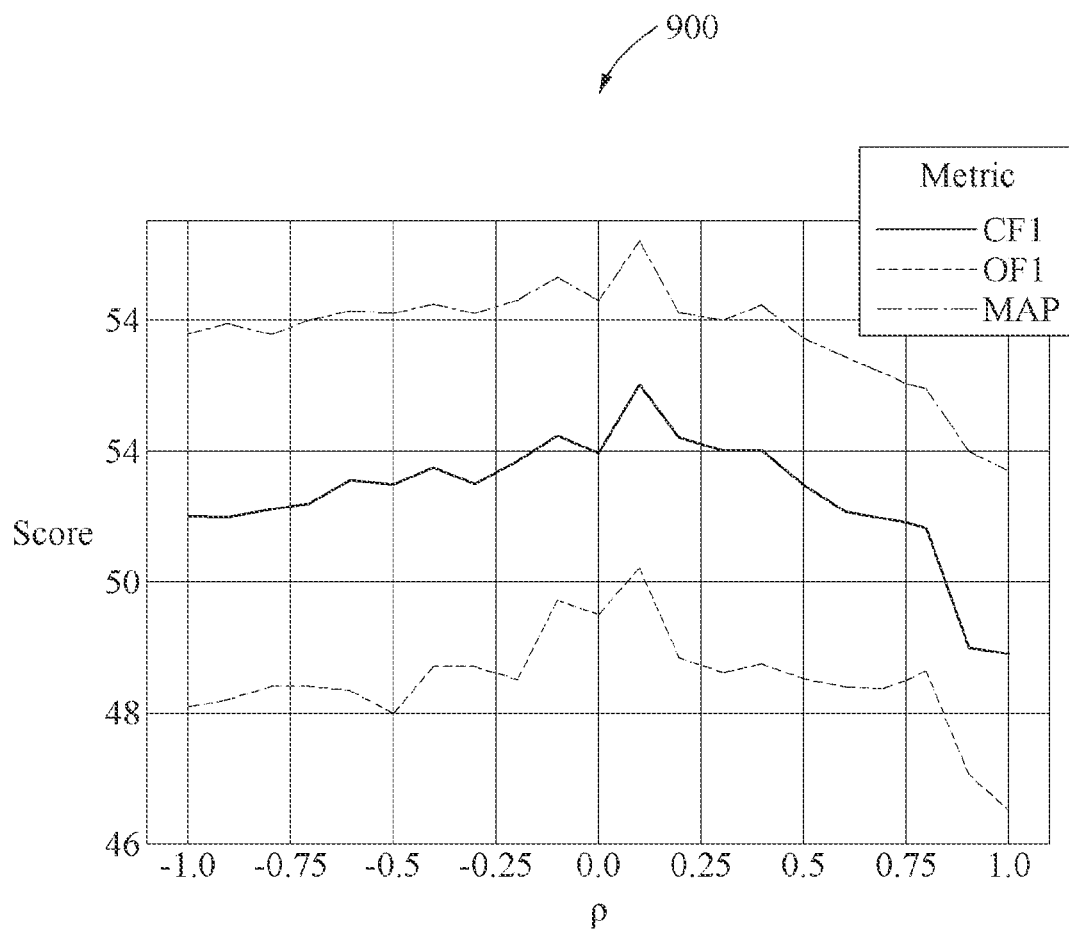
FIG. 9 illustrates an example of a parameter for setting a target partition ratio.
Figure 10:
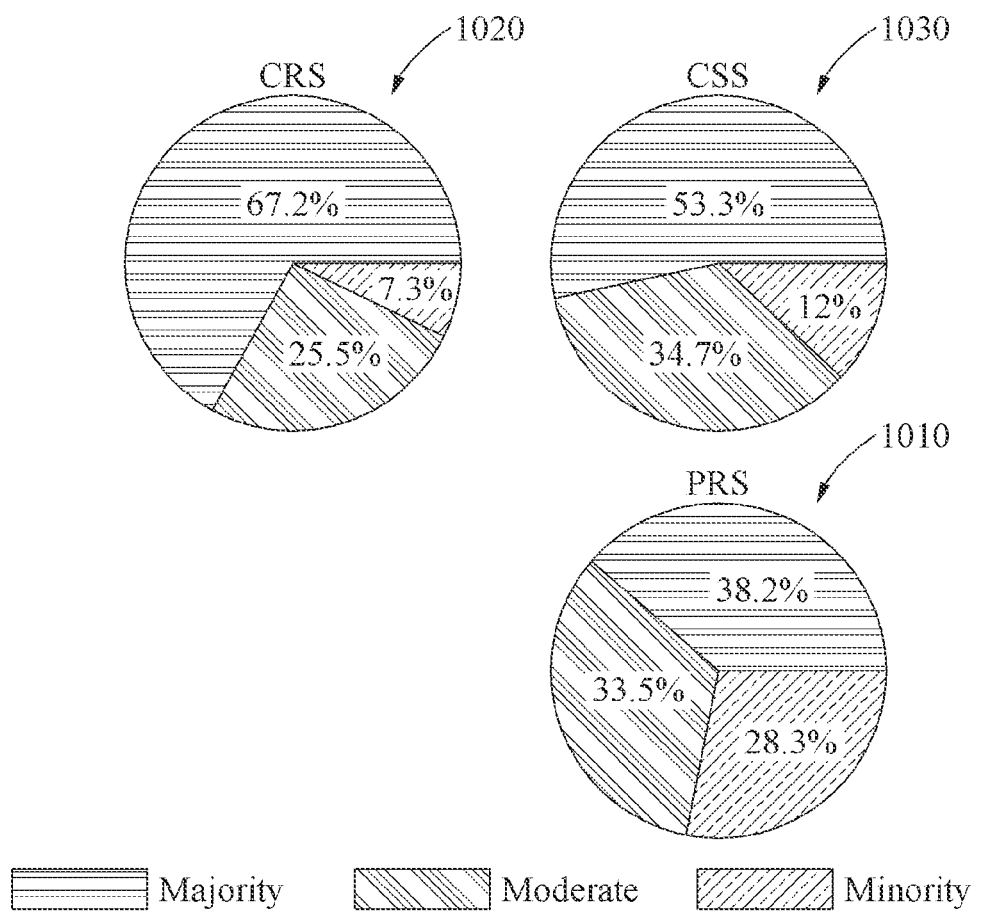
FIG. 10 illustrates an example of a memory occupancy ratio for each label.

FIG. 9 illustrates an example of a parameter for setting a target partition ratio. FIG. 10 illustrates an example of a memory occupancy ratio for each label.

As described above, a target label distribution may vary depending on an allocation exponent $\rho$. For example, in a case in which $\rho=0$, the same memory size may be allocated to all classes, and thus a fair memory distribution may be performed. In a case in which $\rho=1$, a memory that is based on an original occurrence frequency of each class in a data stream may be allocated to a corresponding class. FIG. 9 illustrates performance 900 in a case in which p has a value from −1 to 1. As a measure of the accuracy of a neural network model, an average overall F1 (O-F1) score, a per-class F1 (C-F1) score, and a mAP score are illustrated. Here, it is verified that, when $\rho=0$ at each measure, a high score is obtained.

When a memory is balanced as illustrated in FIG. 10, a neural network model of one or more embodiments trained with data of a balanced reservoir may have a relatively high level of recognition accuracy. Although a conventional reservoir sampling (CRS) method 1020 or a CSS method 1030 indicates an imbalanced distribution that is unequally distributed for major classes, a PRS method 1010 described herein may indicate a balanced memory distribution even for minor classes.

Figure 11:
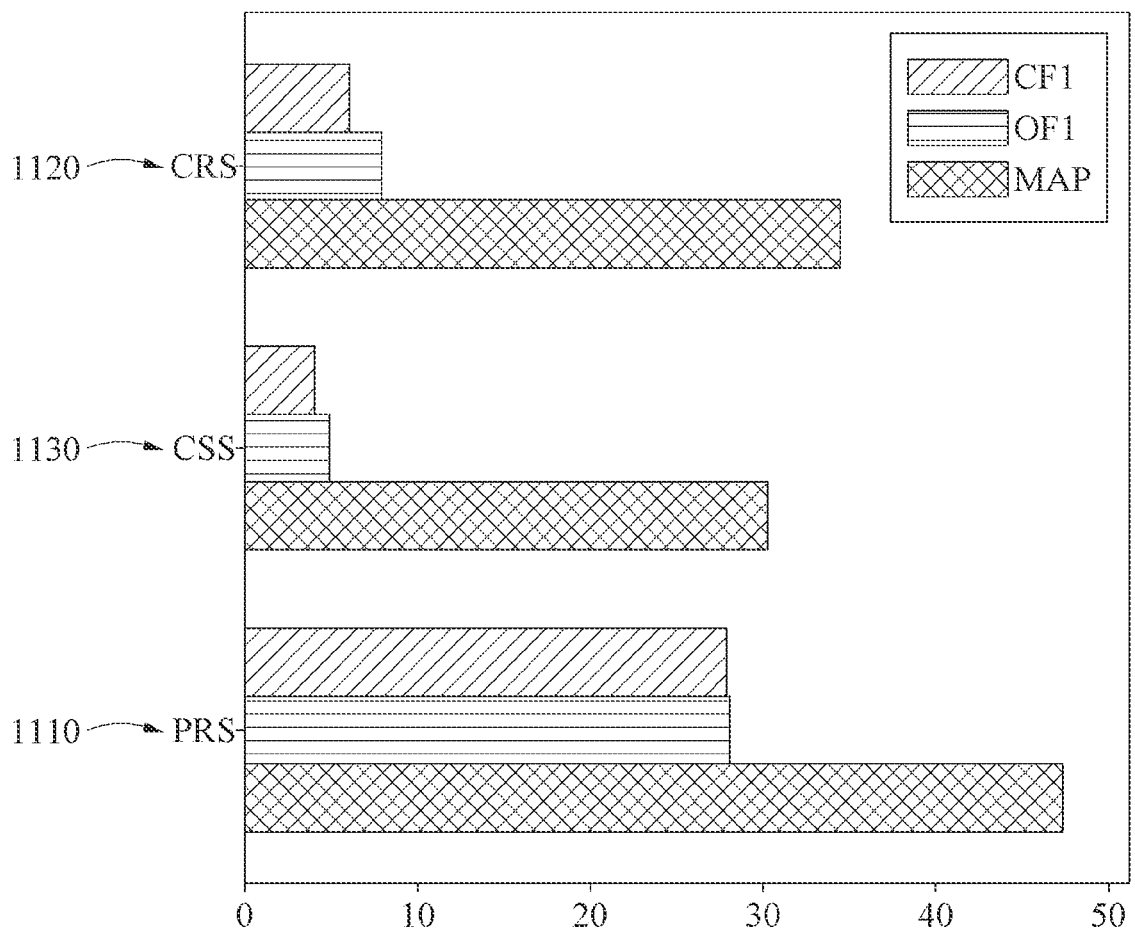
FIG. 11 illustrates an example of a result of comparing a reservoir management method and other methods in terms of performance.

FIG. 11 illustrates an example of a result of comparing a reservoir management method and other methods in terms of performance.

A neural network model trained with training data set based on a PRS method 1110 described herein may indicate scores improved in all measures, compared to a reservoir sampling method 1120 and a CSS method 1130 which are a replay-based baseline methodology. In a graph illustrated in FIG. 11, a horizontal axis indicates a score.

Through the PRS method 1110, the reservoir management device of one or more embodiments described herein may have a higher performance than other methods in terms of minor classes and an overall performance. The reservoir management device may manage data sets for a plurality of tasks. That is, the reservoir management device may allocate a memory space for classes of each task for a multitask, in addition to classes for a single task, based on a minor label. When allocating a memory to each class of the multitask, the reservoir management device of one or more embodiments may reduce an intra-task imbalance and an inter-task imbalance. Here, heterogeneous tasks of the inter-task imbalance may be tasks of different types, such as, for example, an image classification task and a speech classification task. Even in the same image classification task, there may be tasks that are classified based on a purpose, for example, for image classification for an autonomous or self-driving vehicle and for image classification for facial recognition.

In addition, the reservoir management device of one or more embodiments may perform multi-label classification without a task label, which may thus be practically similar to using a shared output head for single-label classification.

Figure 12:
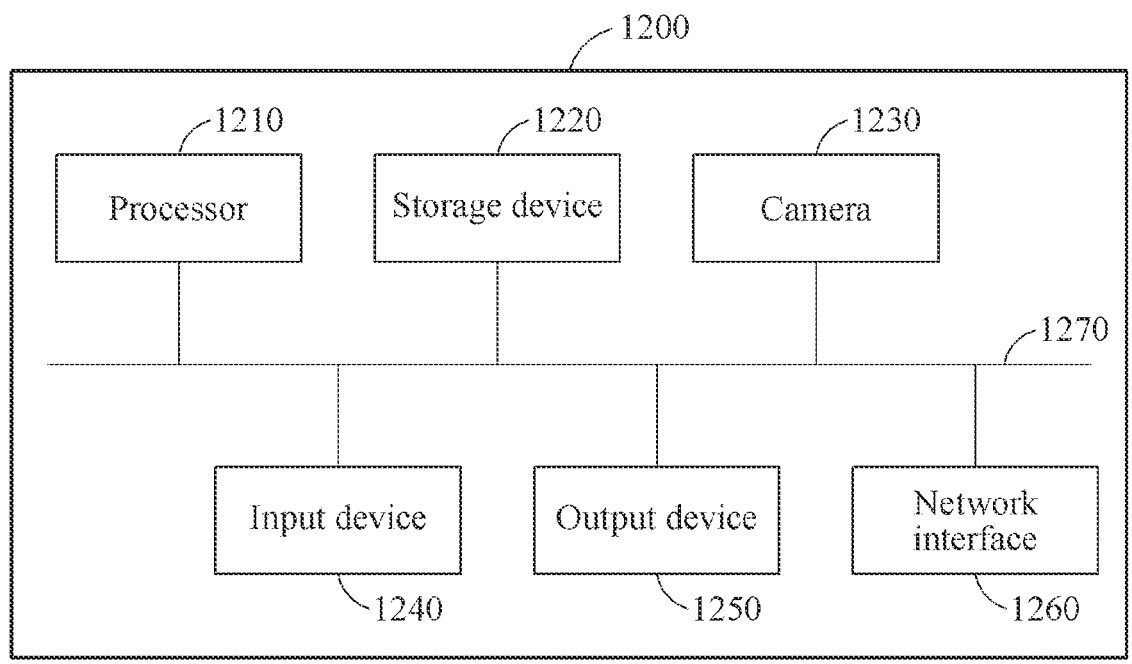
FIG. 12 illustrates an example of a reservoir management device for neural network online learning.

FIG. 12 illustrates an example of a reservoir management device for neural network online learning.

Referring to FIG. 12, a computing device 1200 may be a device that manages sample data for training a neural network model using the reservoir management method described herein, and trains the neural network model using the stored sample data. The computing device 1200 may perform various recognition tasks using the trained neural network model. The recognition tasks may include, for example, detection and classification of nearby objects during traveling of a self-driving or autonomous vehicle, and ID identification, facial recognition, and fingerprint recognition of a user of a smartphone.

The computing device 1200 may be, for example, a reservoir management device, an image processing device, a mobile terminal, a smartphone, a foldable smartphone, a smartwatch, a wearable device, a tablet computer, a netbook, a laptop, a desktop, a personal digital assistant (PDA), a set-top box, a home appliance, a biometrics-based door lock, a security device, a device for financial transactions, a device for starting a vehicle, an autonomous or self-driving vehicle, a drone, or the like.

Referring to FIG. 12, the computing device 1200 may include a processor 1210 (e.g., one or more processors), a storage device 1220, a camera 1230, an input device 1240, an output device 1250, and a network interface 1260. The processor 1210, the storage device 1220, the camera 1230, the input device 1240, the output device 1250, and the network interface 1260 may communicate with one another through a communication bus 1270.

The processor 1210 may execute functions and instructions in the computing device 1200. For example, the processor 1210 may process instructions stored in the storage device 1220. The processor 1210 may perform one or more, or all, of the operations and methods described above with reference to FIGS. 1 through 9. For example, when input data to which label information is mapped is received, the processor 1210 may determine whether to add the input data to a reservoir based on a sampling probability. When the input data is added to the reservoir after the reservoir is filled, the processor 1210 may select candidate data to be removed from among sets of sample data included in the reservoir based on a target label distribution and a current label distribution of the reservoir, and remove the selected candidate data from the reservoir. The processor 1210 may train a neural network model using sample data of the reservoir from which the selected sample data is removed.

In addition, the processor 1210 may perform a recognition task using the trained neural network model, and additionally train online the neural network model in response to a data stream for training being received. Through such additional online training, the neural network model may be personalized and/or customized for an individual user. In addition, the computing device 1200 may train online a neural network model for detecting abnormality in a semiconductor manufacturing process, for example.

The processor 1210 may indicate a result of recognizing an input image using the trained neural network model. The processor 1210 may indicate a result of recognizing data explicitly or implicitly. The implicit indication of such a recognition result may include an operation of internally determining a success or a failure in the recognition, and an operation of transmitting the result to another module. The explicit indication of such a recognition result may include an operation of providing an output indicating a success or a failure in the recognition in a form of visual information, auditory information, and tactile information. For example, in a case in which the computing device 1200 is embodied by an autonomous or self-driving vehicle, the processor 1210 may visually output a result of detecting a nearby object as a nearby object map through the output device 1250. The processor 1210 may control and change a speed, steering, and acceleration of the vehicle based on the result of detecting the object. For another example, in a case in which the computing device 1200 is embodied by a mobile terminal, the processor 1210 may output a result of recognizing a face of a user through a display. The processor 1210 may unlock the mobile terminal when the recognition is successful, and maintain a locked state of the mobile terminal when the recognition is not successful.

The storage device 1220 may store information or data required for the execution of the processor 1210. The storage device 1220 may include a computer-readable storage medium or device. The storage device 1220 may store instructions to be executed by the processor 1210, and store related information while software or an application is being executed by the computing device 1200. The storage device 1220 may be embodied as a memory, and may store a reservoir including or storing therein a plurality of sets of labeled sample data. The storage device 1220 may store the reservoir including the neural network model and the sample data for training. The computing device 1200 may be a reservoir management device, and may partition a space allocated in the reservoir for each class in a balanced way.

A receiver of the computing device 1200 may receive a data stream including input data to which label information is mapped. The receiver may be embodied as the camera 1230 or the network interface 1270 that is to be described hereinafter, or the like.

The camera 1230 may capture an image consisting of a plurality of image frames. For example, the camera 1230 may generate an input image. The camera 1230 may obtain a series of images as a data stream.

The input device 1240 may receive an input from a user through a tactile, video, audio, or touch input. The input device 1240 may include, for example, a keyboard, a mouse, a touchscreen, a microphone, or another device that detects an input from a user and transmits the detected input.

The output device 1250 may provide an output of the computing device 1200 to a user through a visual, auditory, or tactile channel. The output device 1250 may include, for example, a display, a touchscreen, a speaker, a vibration generating device, or another device that provides an output to a user. The network interface 1260 may communicate with an external device through a wired or wireless network, and receive a data stream.

The reservoir management device, the computing device, and other devices and apparatuses, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented reservoir management method, comprising:

determining, based on a sampling probability of an input data which label information is mapped, the sampling probability of the input data is based on an occurrence frequency of each class observed up to a current point in time in a data stream, a target memory allocation size for each class, and a weight for each class, whether to add the input data to a reservoir;

in response to determining to add the input data to the reservoir when the reservoir is filled, selecting candidate data to be removed from among sets of sample data included in the reservoir based on a target label distribution and a current label distribution of the reservoir, and removing the selected candidate data from the reservoir;

training a neural network model using sample data of the reservoir from which the selected candidate data is removed; and generating a recognition result indicating a classification, identity, or presence of an object within an image data or speech data using the trained neural network model.

2. The method of claim 1, wherein the determining of whether to add the input data to the reservoir comprises:

in response to the input data being excluded from an updating of the reservoir, skipping a remaining operation of adding the input data to the reservoir and waiting for subsequent input data of a data stream to be input.

3. The method of claim 1, wherein the determining of whether to add the input data to the reservoir comprises:

adding the input data to the reservoir based on the sampling probability determined for the input data.

4. The method of claim 1, wherein the determining of the sampling probability comprises:

determining the weight for each class based on occurrence frequencies of classes in the data stream and one or more classes labeled to the input data.

5. The method of claim 1, further comprising:

determining the target memory allocation size for each class based on a total memory size allocated for the training of the neural network model and a target partition ratio for each class in the target label distribution.

6. The method of claim 1, further comprising:

determining the target label distribution indicating a target partition ratio for each class based on an occurrence frequency observed for each class in a data stream and an allocation exponent.

7. The method of claim 1, wherein the removing of the selected candidate data comprises:

determining a distance vector corresponding to a difference between the target label distribution and the current label distribution; and selecting the candidate data based on the determined distance vector.

8. The method of claim 7, wherein the determining of the distance vector comprises:

determining a distance value for each class from the distance vector based on a total number of labels labeled to all the sets of sample data included in the reservoir, a number of sets of data labeled with each class, and a target partition ratio corresponding to each class.

9. The method of claim 1, wherein the removing of the selected candidate data comprises:

extracting, from the sets of sample data included in the reservoir, one or more first candidate samples labeled with a class stored greater than the target label distribution; and selecting, from the extracted first candidate samples, a second candidate sample labeled least with a class stored less than the target label distribution.

10. The method of claim 9, wherein the extracting of the first candidate samples comprises:

determining a class with a greatest difference between the target label distribution and the current label distribution among a plurality of classes using a distance vector between the target label distribution and the current label distribution; and extracting, from the sets of sample data included in the reservoir, the first candidate samples labeled with the class with the greatest difference between the target label distribution and the current label distribution.

11. The method of claim 9, wherein the second candidate sample excludes, from the first candidate samples, data labeled with a label stored less than the target label distribution.

12. The method of claim 9, wherein the removing of the selected candidate data comprises:

retrieving a third candidate sample that minimizes a distance difference from the target label distribution in response to being removed from the second candidate sample; and selecting the retrieved third candidate sample as the candidate data to be removed, and removing the selected third candidate sample.

13. The method of claim 1, further comprising:

in response to data labeled with a new class different from classes observed in a data stream being received, expanding a label list of the reservoir.

14. The method of claim 1, further comprising:

in response to determining to add the input data to the reservoir when the reservoir is not filled, skipping the selecting and the removing of the candidate data.

15. The method of claim 1, further comprising:

in response to the input data being added to the reservoir, updating the current label distribution of the reservoir.

16. The method of claim 1, wherein the input data is an image, and the label information includes a label value indicating a class corresponding to a type of an object included in the image.

17. The method of claim 16, further comprising:

indicating a result of recognizing an input image using the trained neural network model.

18. A non-transitory computer-readable storage medium storing instructions that, when executed by a processor, configure the processor to perform the method of claim 1.

19. A computing device comprising:

a memory configured to store a reservoir including a plurality of sets of labeled sample data; and a processor configured to:

determine, based on a sampling probability of an input data which label information is mapped, the sampling probability of the input data is based on an occurrence frequency of each class observed up to a current point in time in a data stream, a target memory allocation size for each class, and a weight for each class, whether to add the input data to a reservoir; and in response to determining to add the input data to the reservoir when the reservoir is filled, select candidate data to be removed from among the sets of sample data included in the reservoir based on a target label distribution and a current label distribution of the reservoir, and remove the selected candidate data from the reservoir;

train a neural network model using sample data of the reservoir from which the selected candidate is removed; and generating a recognition result indicating a classification, identity, or presence of an object within an image data or speech data using the trained neural network model.

20. The device of claim 19, wherein the device is a mobile terminal comprising a receiver configured to receive a data stream including the input data.

21. A mobile terminal comprising:
a memory configured to store a reservoir including a plurality of sets of labeled sample data and a neural network model; and
a processor configured to:
determine, based on a sampling probability of an input data which label information is mapped, the sampling probability of the input data is based on an occurrence frequency of each class observed up to a current point in time in a data stream, a target memory allocation size for each class, and a weight for each class, whether to add the input data to a reservoir;
in response to determining to add the input data to the reservoir when the reservoir is filled, select candidate data to be removed from among the sets of sample data included in the reservoir based on a target label distribution and a current label distribution of the reservoir, and remove the selected candidate data from the reservoir;
train the neural network model using sample data of the reservoir from which the selected candidate data is removed;
generating a recognition result indicating a classification, identity, or presence of an object within an image data or speech data using the trained neural network model.

* * * * *